(12) United States Patent
Walston et al.

(10) Patent No.: US 11,180,421 B2
(45) Date of Patent: Nov. 23, 2021

(54) REPAIR AND/OR REINFORCEMENT OF OXIDE-OXIDE CMC

(71) Applicant: Rolls-Royce Corporation, Indianapolis, IN (US)

(72) Inventors: Jeffrey Allen Walston, Indianapolis, IN (US); Benjamin John Bowin Lai, Indianapolis, IN (US); Sean E. Landwehr, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 29 days.

(21) Appl. No.: 16/560,568

(22) Filed: Sep. 4, 2019

(65) Prior Publication Data
US 2021/0061720 A1 Mar. 4, 2021

(51) Int. Cl.
*C04B 37/02* (2006.01)
*C04B 41/00* (2006.01)
(Continued)

(52) U.S. Cl.
CPC .......... *C04B 37/021* (2013.01); *C04B 41/009* (2013.01); *C04B 41/51* (2013.01);
(Continued)

(58) Field of Classification Search
CPC ..... C04B 37/02; C04B 37/021; C04B 37/023; C04B 37/026; C04B 2235/3217;
(Continued)

(56) References Cited

U.S. PATENT DOCUMENTS 6,733,907 B2   5/2004   Morrison et al.
7,802,799 B1 * 9/2010   Semmes ................ B29C 65/56
                                                   277/627
(Continued)

FOREIGN PATENT DOCUMENTS

EP        3366888 A1    8/2018
WO    2018080417 A1    5/2018
WO    2019112662 A1    6/2019

OTHER PUBLICATIONS

John et al., "Wetting of Aluminum Oxide by Liquid Aluminum," International Journal of High Technology Ceramics, vol. 2, 1986 (Applicant points out, in accordance with MPEP 609.04(a), that the year of publication, 1986, is sufficiently earlier than the effective U.S. filing date, so that the particular month of publication is not in issue.), pp. 73-78.

(Continued)

*Primary Examiner* — Michael P Wieczorek
(74) *Attorney, Agent, or Firm* — Shumaker & Sieffert, P.A.

(57) ABSTRACT

In some examples, techniques of repairing and/or reinforcing oxide-oxide ceramic matrix composite (CMC) materials using a metallic material. In one example, a method including applying a metallic material at an edge of an oxide-oxide CMC substrate; and heating the metallic material to diffuse the metal material into the oxide-oxide CMC substrate at the edge. In another example, a method including applying a metallic material onto a damaged area of the oxide-oxide (Continued)

CMC; applying a reinforcing phase material onto the damaged area of the oxide-oxide CMC; and heating the metallic material to diffuse the metallic material into the oxide-oxide CMC and attach the reinforcing phase material to the damaged area of the oxide-oxide CMC.

20 Claims, 9 Drawing Sheets (51) Int. Cl.
*C04B 41/51* (2006.01)
*C04B 41/88* (2006.01)

(52) U.S. Cl.
CPC ...... *C04B 41/88* (2013.01); *C04B 2235/3217* (2013.01); *C04B 2235/5224* (2013.01); *C04B 2237/38* (2013.01); *C04B 2237/40* (2013.01); *C04B 2237/60* (2013.01)

(58) Field of Classification Search
CPC ........ C04B 2235/5224; C04B 2237/38; C04B 2237/40; C04B 2237/60; C04B 41/5155; C04B 41/009; C04B 41/51; C04B 41/88; C04B 35/803
See application file for complete search history.

(56) References Cited

U.S. PATENT DOCUMENTS

| | | | |
|---|---|---|---|
| 8,715,439 B2 * | 5/2014 | Chakrabarti | C04B 37/025 156/89.11 |
| 9,581,038 B2 | 2/2017 | Hillier et al. | |
| 10,316,695 B2 | 6/2019 | Renggli | |
| 2006/0226290 A1 | 10/2006 | Campbell | |
| 2008/0034694 A1 | 2/2008 | Banta | |
| 2014/0255665 A1 | 9/2014 | Hillier et al. | |
| 2016/0160690 A1 | 6/2016 | Sokhey | |

OTHER PUBLICATIONS

Champion et al., "Wetting of Aluminium Oxide by Molten Aluminium and Other Metals," Journal of Materials Science, vol. 4, No. 1, Jan. 1969, pp. 39-49.
Bao et al., "Wettability of Aluminum on Alumina," Metallurgical and Materials Transactions B, Jun. 24, 2011, 9 pp.

* cited by examiner

REPAIR AND/OR REINFORCEMENT OF OXIDE-OXIDE CMC

TECHNICAL FIELD

The disclosure relates to, in some examples, oxide-oxide ceramic matrix composites.

BACKGROUND

Ceramic matrix composites (CMCs), which may include ceramic fibers in a ceramic matrix, may be employed in a variety of industrial applications that demand excellent thermal and mechanical properties along with low weight, such as gas turbine engine components. Gas turbine engines may include a compressor, combustor and turbine in flow series along a common shaft. Compressed air from the compressor may be mixed with fuel in the combustor to generate hot combustion gases that rotate the turbine blades and drive the compressor, and then are released through an exhaust mixing system. Among the various possible applications for CMCs in gas turbine engines are exhaust system components.

SUMMARY

In some examples, the disclosure describes a method comprising applying a metallic material at an edge of an oxide-oxide ceramic matrix composite (CMC) substrate; and heating the metallic material to diffuse the metal material into the oxide-oxide CMC substrate at the edge.

In some examples, the disclosure describes an article comprising: an oxide-oxide ceramic matrix composite (CMC) substrate having an edge; and a metallic material at least partially penetrating into a surface of the oxide-oxide CMC substrate at the edge.

In some examples, the disclosure describes a method of repairing a damaged area of an oxide-oxide ceramic matrix composite (CMC), the method comprising: applying a metallic material onto the damaged area of the oxide-oxide CMC; applying a reinforcing phase material onto the damaged area of the oxide-oxide CMC; and heating the metallic material to diffuse the metallic material into the oxide-oxide CMC and attach the reinforcing phase material to the damaged area of the oxide-oxide CMC.

In some examples, the disclosure describes an article comprising: an oxide-oxide ceramic matrix composite (CMC) having a damaged area; and a metallic material and a reinforcing phase material applied to the damaged area.

The details of one or more examples are set forth in the accompanying drawings and the description below. Other features, objects, and advantages will be apparent from the description and drawings, and from the claims.

DETAILED DESCRIPTION

In some examples, the disclosure relates example systems and techniques for reinforcing and/or repairing oxide-oxide (ox-ox) CMCs, such as, those used for components of a gas turbine engine. The reinforcement and/or repair of ox-ox CMCs may include applying a metallic material at a location of the ox-ox CMC (e.g., trailing edge, attachment feature having an aperture formed in ox-ox CMC, and/or area of damage) and diffusing the metallic material into the ox-ox CMC, e.g., by heating the metallic material, to bond the ox-ox CMC structure and the metallic material. In some examples, an ox-ox CMC may be repaired by applying a layer of reinforcing phase material (e.g., a ceramic fiber layer) in addition to the metallic material to a damaged area of the ox-ox CMC.

In some examples, ox-ox CMC structures may suffer from low mechanical capability as well as challenges when interfacing with metallic geometry. Structures such as mixers are attractive applications for ox-ox CMCs owing to the materials combination of service temperature, oxidation resistance, and strength to weight ratio qualities. However, mixers or other ox-ox components may be subjected to significant acoustic loading to a thin-walled, cantilevered structure, leading to significant dynamic strains, especially at trailing edges and attachment features. In some examples, the strains may cause the respective fibers layers in an oxide-oxide CMCs to undesirably detach from one another, e.g., in the areas in which the ends of the fiber layers terminate at or near the edges of the ox-ox CMC. Another challenge at attachment features may be the relatively harsh metallic wear rates at sites of mechanical interaction between ox-ox CMC and metallic hardware, e.g., metallic bolts and attachment clips.

In some examples, this disclosure is directed to techniques for reinforcing ox-ox structures with the application of a thin layer of metal to the exterior of the composite structure. Specifically, the embodiment most espoused by this document is the application of a metal that is chemically compatible with the ox-ox structure such that wetting and diffusion occurs, forming a bond between the ox-ox CMC structure and the metallic reinforcement. Examples of ox-ox CMCs and metallic materials are primarily discussed in this disclosure are alumina fiber in an aluminosilicate matrix (e.g., aluminosilicate matrix reinforced with Nextel 610 fiber-AS-N610) composite and aluminum alloy reinforcement. However, examples of the disclosure are not limited to those specific compositions.

In some examples, the disclosure relates to repair of damaged areas of an ox-ox CMC, e.g., damage to an ox-ox CMC sustained in service. In some examples, the repair may allow for partial or full recovery of strength in the damaged region, and/or restore air sealing capability in the damage region. In some examples, the desired outcome (e.g., recovery of strength and/or air sealing) may dictate the specific composition, application method, and reinforcing method employed. For example, in a relatively low stress, low temperature region a recovered strength of less than about 70% of the ox-ox CMC material may be sufficient. These factors may influence which metallic composition or which reinforcing phase is employed for the repair.

For reinforcing applications, a metallic material may be applied at or near an edge of an ox-ox CMC substrate (e.g., at a trailing edge of the substrate or an edge of an aperture formed in the substrate). As will be described below, a variety of techniques may be used to apply the metallic material to the ox-ox CMC.

In some examples, the metallic material may be applied as a solid metal layer. For example, a thin metal layer may be adhered to the ox-ox CMC in the desired area using an adhesive, e.g., by using a metallic tape. Regarding reinforcement of edge features, such as trailing edges of a mixer, a tape application or other adhesive method could be advantageous. The desired metal could be in the form of a tape (e.g., similar to commercially available aluminum foil tapes) which could be manually or robotically applied to the edge of an ox-ox CMC. The tape may be applied and then folded such that substantially half or most of the tape would adhere to one side of the edge of a structure, and one side to the other, encompassing the edge. In some examples, the adhesive may be tailored to be beneficial to the wetting and/or diffusion process, e.g., either via the application of heat or a chemical process. The tape or other solid metal layer may then be heated via any suitable heat source such that wetting of the ox-ox structure and diffusion of the metal into the ox-ox CMC occurs. Depending on the chemical requirement of the tape or other metal layer composition, heating may be required in an inert or vacuum environment, e.g., to prevent oxidation from disrupting wetting and appropriate bonding. In some examples, an advantage of a tape application (or other bonding of a metal layer via an adhesive) method may include the freedom to apply the reinforcement to a relative non-uniform or non-planar edge, so long as mild wrinkling of the tape is acceptable in the final product. Additionally, a low temperature polymer adhesive as part of a tape system, upon burnout or pyrolysis, may provide a source of carbon to enhance wetting of the metallic reinforcement and serve as a more intimate bond.

In some examples, the metallic material may be applied to the ox-ox CMC as a liquid metal material. For example, regarding reinforcement of planar edge features of an ox-ox CMC, such as trailing edges of mixers, reinforcement of the ox-ox structure may be achieved via dip coating or other technique in which a liquid metal is applied to the surface of an ox-ox CMC. The reinforcement metal may be heated to a liquid state, and the edge of the CMC substrate may be lowered or otherwise immersed in the liquid metal. Wetting of the ox-ox material by the liquid metal may lead to a diffusion and mechanical bond upon solidification. An advantage of a dip coating method may be the highly regular and reproducible nature of the solidified reinforcement, as well as a high likelihood of a strong, uniform diffusion bond. Depending on the chemical needs of the ox-ox CMC and reinforcement metal, an inert or vacuum environment might be desirable to prevent unwanted oxides from interfering with the bond. Once solidified, the reinforcement metal may be machined or otherwise manipulated into the desired final shape or form.

As another example, regarding the reinforcement of face features of the ox-ox CMC (e.g., such as apertures in the CMC for bolts or clamping locations), reinforcement of the ox-ox structure could be achieved via application of the reinforcing metal in a liquid state. Similar to a dip coating method, the liquid metal may be made to locally bond to the ox-ox CMC in the vicinity of the feature in question, controlled by means of mechanical gating and/or sealing, or via the application of surface treatments that prevent wetting (e.g., referred to as a "stop-off" in some cases). Once solidified, the reinforcing metal may be machined or otherwise manipulated into the desired shape or form. In some examples, reinforcement of this kind may be used to create flat contact faces, bolt spot faces, grommets, or other similar features. Such reinforcement may allow the reinforcing material to interact with metallic attachment hardware, rather than the ox-ox CMC material, improving the life of attachment features.

In some examples, the metallic material may be applied to the ox-ox CMC by depositing a metal-containing powder on the ox-ox CMC. For example, application of reinforcing metal may be performed via laser-melted powder deposition. Powder deposition techniques may be capable of applying precise thicknesses of powdered metal to a surface via local melting with a laser-equipped multi-axis head, and may similarly locally deposit the reinforcement metal layer in examples of this disclosure. While in some examples such a technique may be limited by requiring line-of-sight as well as proximity access for the head, it may otherwise be capable of applying the reinforcement to any part of an ox-ox CMC.

In some examples, application of reinforcing metal powder may be performed via locally deposited powder followed by melting of the powder via either local heating or globally heating the ox-ox CMC. The powder may be deposited and retained in the desired location by gravity, electrostatic forces, and/or by the use of an adhesive present in the area where reinforcement is desired. The adhesive chemistry may be tailored such that it would improve wetting capability of the powder once heated and melted.

In some examples, the metallic material may be applied in the desired area of an ox-ox CMC by mechanically attaching a solid metal layer to the ox-ox CMC. For example, the reinforcement metal may be introduced to the ox-ox structure via mechanical retention features. and then once in place, heated to bond the reinforcement to the ox-ox structure. Examples of such an approach may include crimped or laminated tapes (such as along an edge) made of thin sheet metal or foil that are deformed onto the ox-ox structure. Crimped tapes may include metallic attachment features that engage and penetrate the ox-ox structure, improving the ability of the metal layer to couple securely to the ox-ox structure prior to melting.

As another example, grommets that are deformed into place in holes in the ox-ox structure to reinforce aperture features (such as bolt holes) may be employed. In some examples, such grommets are similar to those employed in OMC structures at bolt hole/attachment features. After the grommet is deformed into place, melting (or solid-state diffusion) could be performed to bond the grommet onto the ox-ox CMC structure.

As another example, similar to the crimped tapes described above, metallic reinforcing plates may be applied to the ox-ox CMC material and mechanically retained via tines or other features meant to engage the ox-ox structure and retain it mechanically prior to melting of the plate.

As described herein, the metallic reinforcement of ox-ox CMC structures may be applied at a variety of locations on an ox-ox CMC component. In some examples, the application location may include trailing edges of an ox-ox CMC component, e.g., such as a mixer. The trailing edge of a mixer may be an edge over which air flows over when exiting the component during operation. For mixer and non-mixer components, the trailing edge may refer to a free edge of the component that is the last to interact with the flow transiting the system. Metallic reinforcement may improve interlaminar tensile (ILT) capability of the ox-ox CMC material. In this area where dynamic strains may be relatively large, trailing edge reinforcement may also improve dynamic response by altering the natural frequencies or mode shapes to one more advantageous to the function of the mixer. For example, the thickness or extent of metallic reinforcement may be tuned in order to modify the ox-ox CMC structure's natural frequency or mode shape to not occur at a cruise or maximum takeoff (MTO) operating condition or occur with reduced dynamic deflections at critical locations (such as attachment features), improving life, and/or reducing the structural requirements, e.g., in the case of a mixer formed from the ox-ox CMC. The reduction in structural requirements may lead to an improvement (e.g., reduction) in component weight.

In some examples, the metallic reinforcement may be applied in the area of attachment features in an ox-ox CMC component. For example, through holes for bolts, spot faces for bolts, and/or contact locations, e.g., for attachment clips may be reinforced to improve fastener life, improve manufacturing capability, and/or improve the stress state in the vicinity of the attachment feature. Fastener life may be improved by preventing metallic fastener hardware from interacting with the tribologically aggressive ox-ox CMC material, instead interacting with the metallic reinforcement layer. Manufacturing capability may be improved by the ability to machine a sufficiently thick layer of the reinforcement material to have a spot face, or flat contact feature, which may be difficult or not possible with the manufacturing capability present for only an ox-ox CMC structure. This may also allow for machining tolerances to be achieved in attachment features that are otherwise not practical or possible to achieve with structures comprised of solely the ox-ox CMC material. Further, the stress state of the ox-ox CMC structure may be improved in the vicinity of attachment features by taking a relatively localized stress at the feature and displacing it over larger volume of the material, owing to the local structural reinforcement of the metallic layer. Lower $K_t$ at attachment features may improve mixer life, and/or reduce structural requirements, reducing the weight of the part and/or improving manufacturability. The parameter $K_t$ refers to stress concentration factor due to geometric features (e.g., stress concentrations next to a hole or sharp corner) where stresses are locally higher in the material relative to the average stress in the material away from the feature.

In some examples, a metallic material may be applied to a damaged area of an ox-ox CMC to repair the damaged area (e.g., by strengthening the ox-ox CMC in the damaged area and/or reinstating the air seal in the damaged area). A reinforcing phase material (e.g., in the form of ceramic fibers) may be applied in addition to the metallic material to the damaged area of the ox-ox CMC component. In some examples, a crack sustained in an ox-ox CMC component (e.g., in service) may be repaired by applying a reinforcing phase material (e.g., a ceramic fiber fabric) and a compatible metallic material in the area of the crack (e.g., where the reinforcing phase material in located between layers of the metallic material over the cracked area of the CMC). The metallic material may be heated (e.g., in addition to the application of pressure to the metallic material and reinforcing phase material) to diffuse the metallic material into the ox-ox CMC and bond the reinforcing phase material to the ox-ox CMC. In some examples, the repair of the ox-ox CMC may reduce or prevent air leakage in the area of the crack and/or improve or recover the strength of the ox-ox CMC in the area of the crack.

For ease of description, examples of the disclosure are primarily described in the context of repairing and/or reinforcing a mixer formed of an ox-ox CMC material. However, examples of the disclosure are not limited to mixer of a gas turbine engine but may apply to any component made of an ox-ox CMC in a gas turbine engine or other system employing ox-ox CMC components. For example, components other than mixers may include heat shields, ducts, tail cones, exhaust nozzles, airfoils, and fairings, e.g., of a gas turbine engine.

Figure 1:
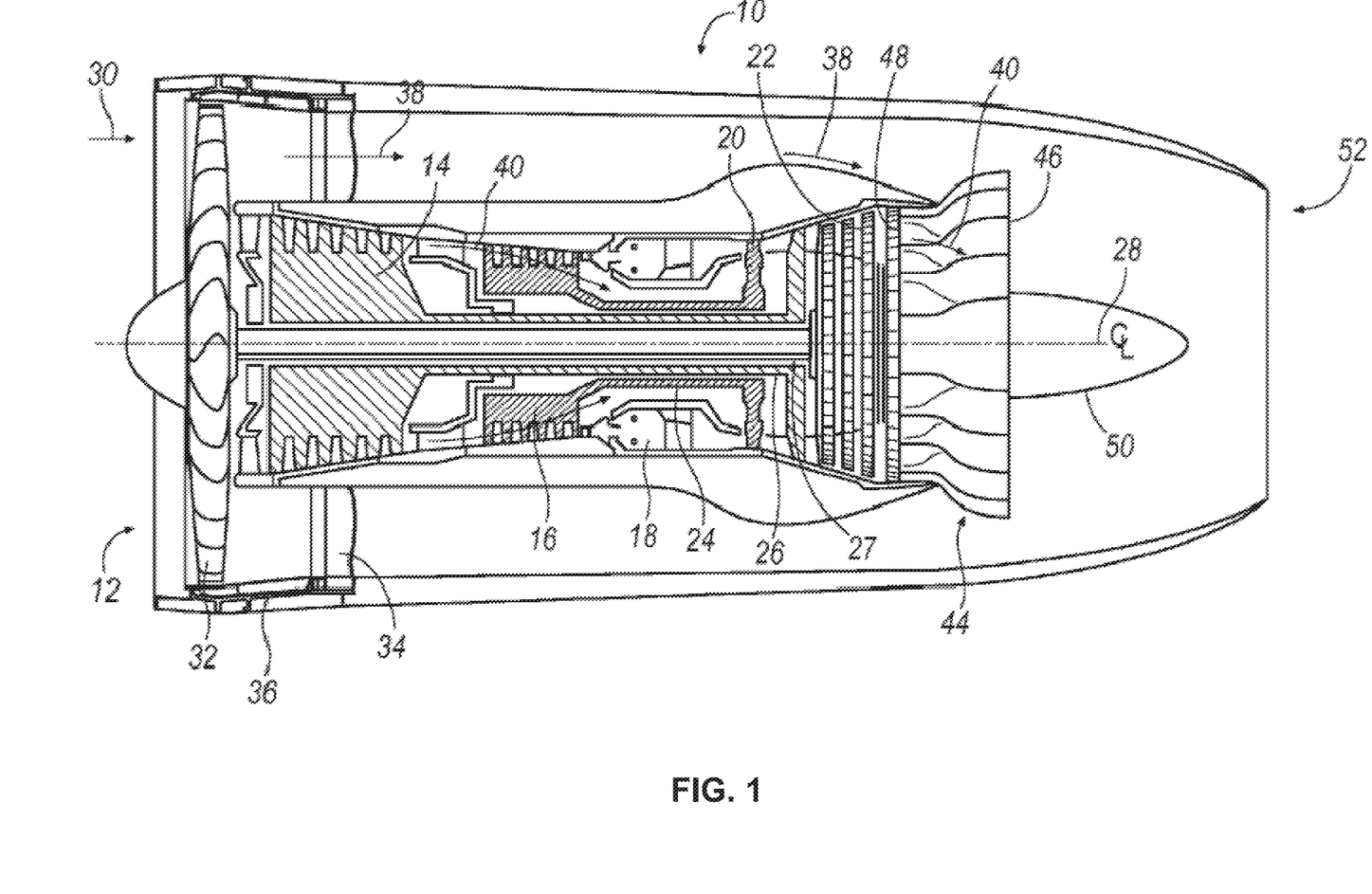
FIG. 1 is a schematic diagram illustrating an example gas turbine engine including a mixer.

FIG. 1 is a schematic diagram illustrating an example gas turbine engine 10, which includes a fan 12, a low pressure compressor and a high pressure compressor, 14 and 16, a combustor 18, and a high pressure, mid pressure and low pressure turbine, 20, 21 and 22, respectively. The high-pressure compressor 16 is connected to a first rotor shaft 24 while the low-pressure compressor 14 is connected to a second rotor shaft 26. The low-pressure turbine 22 is connected to another shaft 27. The shafts extend axially and are parallel to a longitudinal center line axis 28. FIG. 1 illustrates a three shaft engine, it will be appreciated that examples further contemplate any multi-shaft configuration (e.g., two shaft) and/or single shaft configurations.

Ambient air 30 enters the fan 12 and is directed across a fan rotor 32 in an annular duct 34, which in part is circumscribed by fan case 36. The bypass airflow 38 provides a large fraction of engine thrust while the primary gas stream 40 (also referred to as core airflow) is directed to the combustor 18 and the turbines 20, 21, 22, and then exhausted through a nozzle generating thrust. The engine 10 includes an improved exhaust mixing system 44. The system 44 may include a lobed mixer 46 which can be coupled to an engine interface or support 48 (e.g., rear turbine support). The exhaust mixing system 44 enhances the mixing of the core airflow 40 that passes through the low-pressure turbine 22 with the bypass airflow 38 that passes over the lobed mixer 46, thus increasing thrust. The mixing of the core airflow 40 and the bypass airflow 38, while each pass over a tail cone 50 and exit at exhaust nozzle 52, may also reduce turbine noise.

In some examples, one or more components of engine 10 may be formed of an oxide-oxide CMC material, such as high strength ceramic alumina fibers in an alumina oxide composite matrix. For example, lobed mixer 46 may be fabricated from an oxide-oxide CMC material. An oxide-oxide CMC material may include oxide fibers in an oxide matrix (e.g., as compared to a SiC—SiC CMC having a silicon carbide fiber phase in a silicon carbide matrix phase). In some examples, the oxide fibers may be in the form of one or more oxide fiber layers, e.g., fiber plies, which generally extend along an x-y plane. In the case of multiple fiber layers, the fiber layers may be stacked on each other and may include one or more z-directional fibers to attach the stacked layers to each other. The oxide fibers may be continuous or discontinuous fibers having any suitable fiber denier. The oxide fiber layers may be woven or non-woven fabric layers formed of oxide fibers. Example oxide fiber phase may include those principally composed of alumina, including but not limited to, those available under the trade designation Nextel from 3M, Maplewood, Minn., such as Nextel 610. Other fiber phase examples include Nextel 312, Nextel 440, and Nextel 720. Example oxide matrix phase may include pure alumina or aluminosilicate variants. Other oxide fibers and oxide matrix materials are contemplated.

Example ox-ox CMCs of the disclosure may be made using any suitable technique. For example, a process including the autoclave and sinter of pre-impregnated fabric (prepreg) may be employed. A ceramic oxide fiber fabric may be pre-impregnated with a ceramic oxide slurry creating sheets of fabric with interpenetrating ceramic matrix phases, commonly known as prepreg. Ceramic oxide prepreg material is laid up in balanced and symmetric configurations to form near-net component geometry, typically assisted by tooling or other reinforcements. The layups are then autoclaved and sintered to form final consolidated material.

As described herein, examples of the disclosure may relate to the reinforcement of ox-ox CMC components, such as, mixer 46 shown in FIG. 1, by applying a metallic material to a portion of the ox-ox CMC, e.g., at or near an edge such as a trailing edge, or at or near an edge of an aperture extending through the ox-ox CMC, and heating the metallic material to diffuse the metal into the ox-ox CMC.

Figure 2:
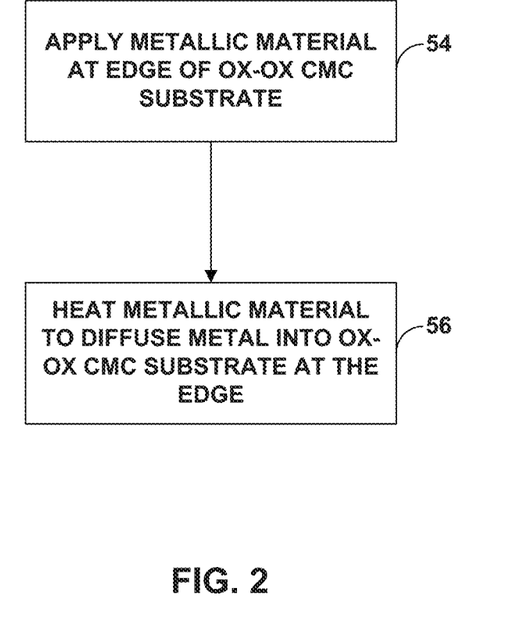
FIG. 2 is a flow diagram illustrating an example technique for reinforcing an oxide-oxide CMC with a metallic material in accordance with the disclosure.

FIG. 2 is a flow diagram illustrating one example of such a technique. For ease of description, the example technique will be described with regard to FIGS. 3A-3C, which are schematic diagrams showing cross-sectional views of an ox-ox CMC 60 including an edge 72 (e.g., a trailing edge of mixer 46 of engine 10). CMC 60 includes a plurality of fiber layers 62A-62F (collectively fiber layers 62), which may be plies or layers of fabric formed from oxide fibers, such as those example oxide fibers described above. While six fiber layers are shown, CMC 60 may include any suitable number of fiber layers. As shown, fiber layers 62 are stacked on each other, and each individual layer 62A-62F terminates or otherwise ends at edge 72 of CMC 60. While not shown, in some examples, one or more z-directional fibers may extend between layers 62, e.g., in order to increase bonding between the fiber layers.

Figure 3A:
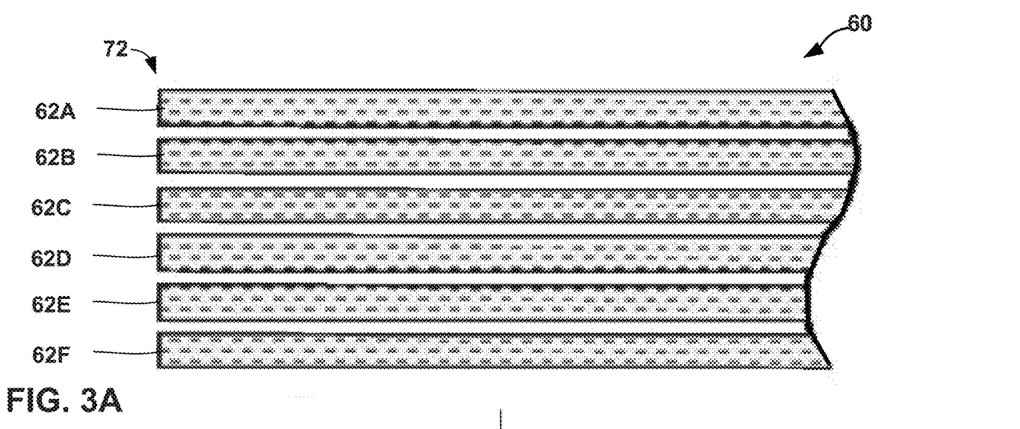
FIGS. 3A-3C are conceptual diagrams illustrating the reinforcement of at an edge of oxide-oxide CMC with a metallic material in accordance with an example of the disclosure.
Figure 3B:
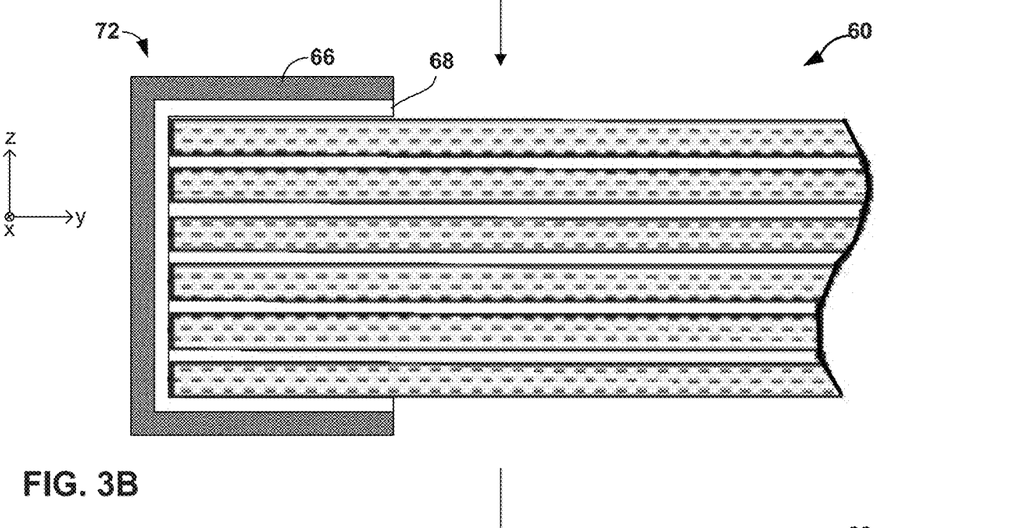
Figure 3C:
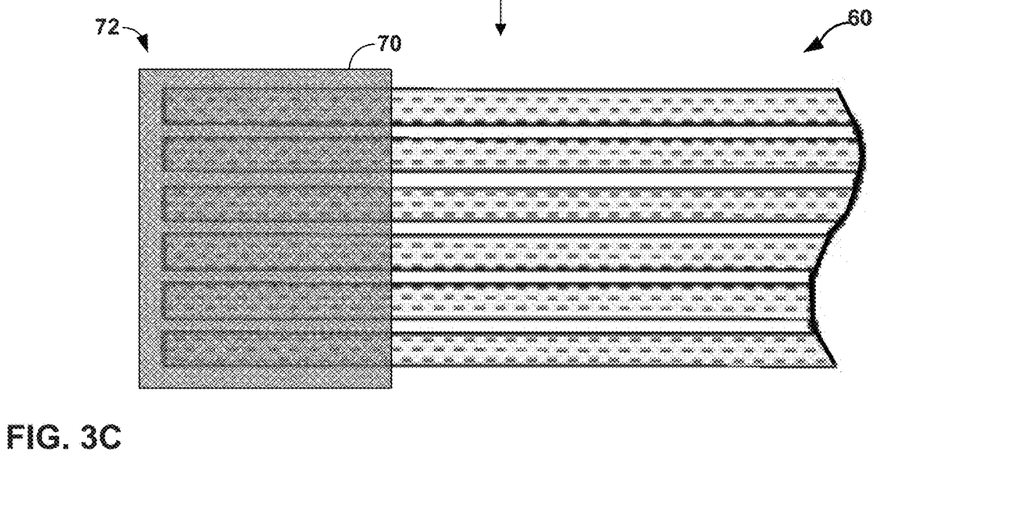

CMC 60 may have any suitable thickness (in the labelled z-direction). In some examples, CMC 60 has a thickness about 0.5 mm to about 4.0 mm, such as about 1.2 mm to about 2.5 mm (e.g., in cases in which CMC 60 includes about 5 to about 12 plies). Other values are contemplated. Each individual fiber layer 62A-62F of CMC 60 may have a thickness of about 0.1 mm to about 0.4 mm, such as about 0.2 mm to about 0.25 mm, the individual layers may each have the same thickness or different thicknesses compared to each other. Although not shown in detail, the fiber layers 62 are in an oxide matrix phase. Examples of the oxide matrix phase include those matrix materials described above.

In some examples, during operation of engine 10, trailing edge 72 of mixer 46 may be subjected to significant acoustic loading or other forces, as described above. In some examples, such forces may cause the individual fiber layers 62 to detach or otherwise separate from each other at edge 72. Accordingly, it may be desirable to reinforced CMC 60 in the area of edge 72. Additionally, or alternatively, the reinforcement described herein may increase toughness and resilience of a component against foreign and domestic object damage (FOD and DOD).

In accordance with the example technique of FIG. 2, metallic material 66 may be applied at edge 72 of CMC 60 (54). Metallic material 66 may include one or more metal such as, e.g., aluminum, iron, nickel, magnesium, cobalt, or alloys thereof. Metallic adherence may be maintained with alloy selection and composition modification. Metallic material 66 may be manually or robotically applied. As shown, metallic material 66 may be wrapped around the entire edge 72 from the top to bottom of CMC 60. In some examples, metallic material 66 may be applied to only a portion of the top, side, or bottom of CMC 60, or some combination thereof.

Metallic material 66 may be in the form of a solid metal material, such as a metal sheet or metal foil. In the example of FIG. 3A, metallic material 66 is attached to edge 72 by optional bond layer 68. Bond layer 68 may be an adhesive material that adheres metallic material 66 to the outer surface of CMC 60 in the area of edge 72. In some examples, metallic material 66 and bond layer 68 may be a metallic tape which is adherable to CMC 60. In some examples, it may be desirable to use a metallic tape or other type of bond layer 68 to apply metallic material 66, e.g., to allow for the freedom to apply the reinforcement metallic material 66 to a relative non-uniform or non-planar edge, so long as mild wrinkling of the metallic material 66 is acceptable in the product.

Once metallic material 66 is applied at edge 72 of CMC 60, metallic material 66 may be heated to a temperature that causes metallic material 66 to diffuse into CMC 60 (56). In some examples, the heating of metallic material 66 may result in wetting of the surface of CMC 60 in the area over which metallic material 66 is applied. In some examples, the heating of metallic material 66 may be sufficient to melt or otherwise liquify metallic material 66, e.g., so that the metallic material infiltrates into CMC 60. In some examples, metallic material 66 may be heated to a temperature of at least about 400 degrees Celsius (° C.), such as, about 440° C. to about 850° C. In some examples, the metallic material 66 may be heated to no greater than about 900° C. The temperatures (e.g., maximum temperature) may depend on the type/grade of ceramic fiber used, or the matrix phases present.

Any suitable technique may be used to heat metallic material 66 as described herein. In some examples, CMC 60 and metallic material 66 may be heated by a furnace, e.g., to globally heat CMC 60 and material 66. In other examples, local heating accomplished by other methods may be employed. In some embodiments the local heating may be accomplished by utilization of laser energy. In some examples, the heating of metallic material 66 (56) may take place in an inert or vacuum environment to prevent unwanted oxides from interfering with the bond.

As shown in FIG. 3C, the diffusion of metallic material 66 creates reinforced portion 70 at edge 72 of CMC 60. Reinforced portion 70 may include metal from the diffusion of metallic material 66 that bonds with the fibers of fiber layers 62 and/or the oxide matrix phase of CMC 60. In this manner, the composite material is reinforced with a more compliant metallic phase. As shown in FIG. 3C, in some examples, reinforced portion 70 may extend through the entire thickness of CMC 60, while in other portions, reinforced portion 70 may extend only partially into the surface of CMC 60, e.g., depending on the penetration and amount of metallic material 66 applied to edge 72 of CMC 60. Once solidified, reinforcement portion 78 may be machined or otherwise manipulated into the desired final shape or form.

Metallic material 66 may have any suitable thickness. The thickness of metallic material 66 may be selected based on the thickness of CMC 60, e.g., so that enough metallic material is present to diffuse into CMC 60 to the extent desired, e.g., either fully or partially through the thickness of CMC 60. In some examples, metallic material 66 may have a thickness of at least about 0.001 inches or at least about 0.002 inches, such as, about 0.001 inches to about 0.010 inches or about 0.002 inches to about 0.010 inches. Other values are contemplated.

Any suitable material may be used for optional bond layer 68. In some examples, bond layer 68 may include a polymer adhesive, such as (including but not limited to) 2-ethylhexyl acrylate, n-butyl acrylate, methyl acrylate, and t-butyl methacrylate. In some examples, a low temperature polymer adhesive may be used in which, upon burnout or pyrolysis (e.g., during heating of metallic material 66), may provide a source of carbon to enhance wetting of the metallic reinforcement material and serve as a more intimate bond.

As described herein, a metallic material such as metallic material 66 may be applied in the area of edge 72 so that reinforcement portion 70 is formed in the area of edge 72 of CMC 60. In some examples, metallic material 66 may be applied so that reinforcement portion 70 is located at edge 72 and extends away from edge 72 in the y-direction at least about 0.250 inches, such as about 0.050 inches to about 0.5 inches. In other examples, reinforcement portion 70 may be located directly adjacent to edge 72 but not encompass edge 72 of CMC 70. For examples, the nearest boundary of reinforcement portion 70 may be within at least about 0.250 inches of edge 70, such as about 0.050 inches to about 0.5 inches from edge 70 of CMC 70. In some examples, metallic material 66 may be applied at edge 72 of CMC 60 by applying metallic material 66 exactly onto edge 72 or directly adjacent to edge 72 but not covering edge 72.

Figure 4A:
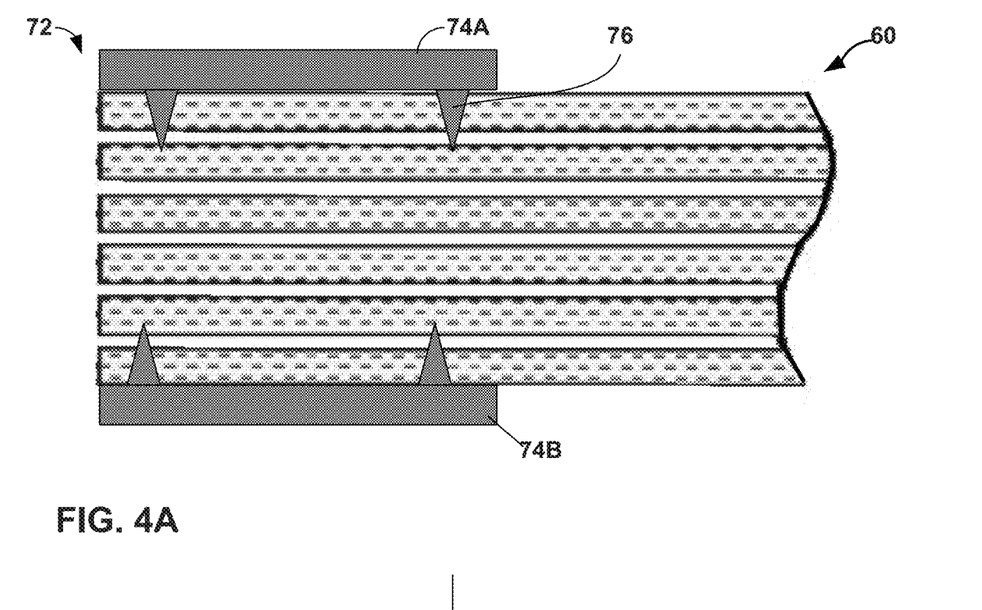
FIGS. 4A and 4B conceptual diagrams illustrating the reinforcement of at an edge of oxide-oxide CMC with a metallic material in accordance with another example of the disclosure.
Figure 4B:
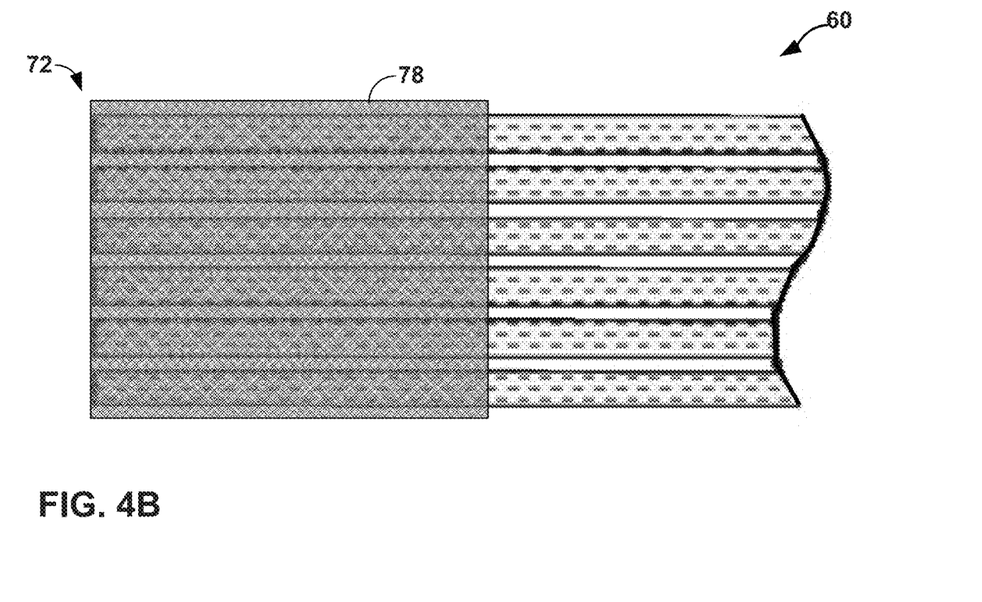

In the example of FIGS. 3A-3C, metallic material 66 takes the form of a solid metal material applied at edge 70 of CMC 60 by attaching metallic material 66 to CMC 60 using bond layer 68. FIGS. 4A-4B are schematic diagrams illustrating another example in which metallic material 74 is applied at edge 72 of CMC 60 on the top and bottom of CMC 60 and attached to CMC 60 without using a bond layer. For example, as shown in FIG. 4A, metallic material 74A and 74B (collectively metallic material 74) each include two attachment features such as individual attachment feature 76. To apply metallic material 74 at edge 72 of CMC 60 as shown in FIG. 4A, metallic material 74 may be positioned adjacent to the outer surface of CMC 60 and then pressure may be applied to penetrate attachment features 76 into the surface of CMC 60 to attach metallic material 74 to CMC 60 (54). The penetration of attachment features 76 engage CMC 60 and retain metallic materials 74 mechanically prior to heating/melting of metallic material 74. While four attachment features 76 are shown in FIG. 4A (two for each of metallic material 74A and 74B), any suitable number may be employed.

In the example of FIG. 4A, attachment features 76 are shown as tapered protrusions. However, any suitable attachment features may be employed. In some examples, attachment feature 76 may take the form of a tine. Other examples could include but are not limited to cylindrical, conical, barbed, hooked, or any other form otherwise suited to engaging and mechanically retaining the reinforcing material prior to infiltration.

In some examples, other techniques may be employed to apply a solid metallic material at edge 72 of CMC 60. For example, temporary clamps or other fasteners may be used to fix metallic material 74 relative to CMC 60 in the desired location prior to heating metallic material as described herein. In some examples, when the structure allows, metallic material 74 may be crimped or otherwise deformed relative to CMC 60 to fix the metallic material 74 relative to CMC 60 until metallic material 74 is heated.

Metallic material 74 and reinforcing portion 78 (FIG. 4B) may be the same or substantially similar to that of metallic material 66 and reinforcing portion 70, respectively, of FIGS. 3B and 3C. As described above, once metallic material 74 is applied to CMC 60, metallic material 74 may be heated (e.g., to melt metallic material 74) so that the material diffuses into CMC 60, and forms reinforcement portion 78 upon cooling (56).

In other examples, in addition to, or as an alternative to, applying a solid metallic material (such as metallic materials 66 and 74) at an edge 72 of CMC 60, a liquid metallic material may be applied to edge 72 of CMC 60. In some examples, a dip coating process or other suitable process may be employed to coat edge 72 and adjacent areas of CMC 60 with the liquid metal. For example, edge 72 of CMC 60 may be immersed in a liquid metal, such as the metals described above for metallic material 66, to apply the liquid metal to edge 72 of CMC 60. The liquid metal may bond locally to CMC 66 at edge 72. In some examples, since the liquid metal is already melted, a separate heating step may not be required to diffuse the metal into CMC 60 to form a reinforcement portion, such as reinforcement portions 70 and 78, as described above. In some examples, an advantage of a dip coating method or other liquid application method may be the highly regular and reproducible nature of the solidified reinforcement portion, as well as a high likelihood of a strong, uniform diffusion bond.

In other examples, rather than immersion of edge 72 in a liquid bath, a metallic material may be applied at edge 72 (or other desired location) by applying a liquid metal to one or more surfaces of CMC 60 and controlled by mechanical gating and/or sealing, or by surface treatments that prevent wetting. Any suitable application technique may be employed, including, e.g., pouring, injection, vacuum-motivation, and immersion.

In other examples, in addition to, or as an alternative, a metal-containing powder may be deposited on the surface of CMC 60 at edge 72 (e.g., at the location shown in FIG. 3B for metallic material 66), and melted on CMC 60 to diffuse the metal into CMC 60. The metal-containing powder may include one or more of the metals described above for metallic material 66. In some examples, the powder may be deposited and retained in the desired location by gravity, electrostatic forces, and/or by the use of an adhesive present in the area where reinforcement is desired. The deposited powder may then be heated, e.g., as described above for the example of FIGS. 3A-3C, to melt the powder in a manner than forms a reinforced portion, such as reinforced portions 70 and 78.

In some examples, a laser metal deposition (also referred to as laser metal powder deposition) process may be employed. Laser metal deposition may include feeding a metal-containing powder through a nozzle or other delivery device, which directs the powder towards the surface of CMC 60. The powder exiting the nozzle may be melted by a laser heating source to form a melt pool from the powder, which is then deposited on the surface of CMC 60 in the desired area. The deposited melted powder may then diffuse into CMC 60 as described above to form a reinforced portion, such as reinforced portions 70 and 78.

While the above examples have been described with regard to the application of a metallic material at trailing edge of mixer 46 to form a metal reinforced portion of CMC 60, in other examples, such edge reinforcement may be applied in the area of CMC 60 other than a trailing edge. For example, edge 72 of CMC 60 may be an edge of an aperture formed in the body of CMC 60, e.g., used for the attachment of mixer 46 to other components using mechanical fasteners, such as bolts.

Figure 5:
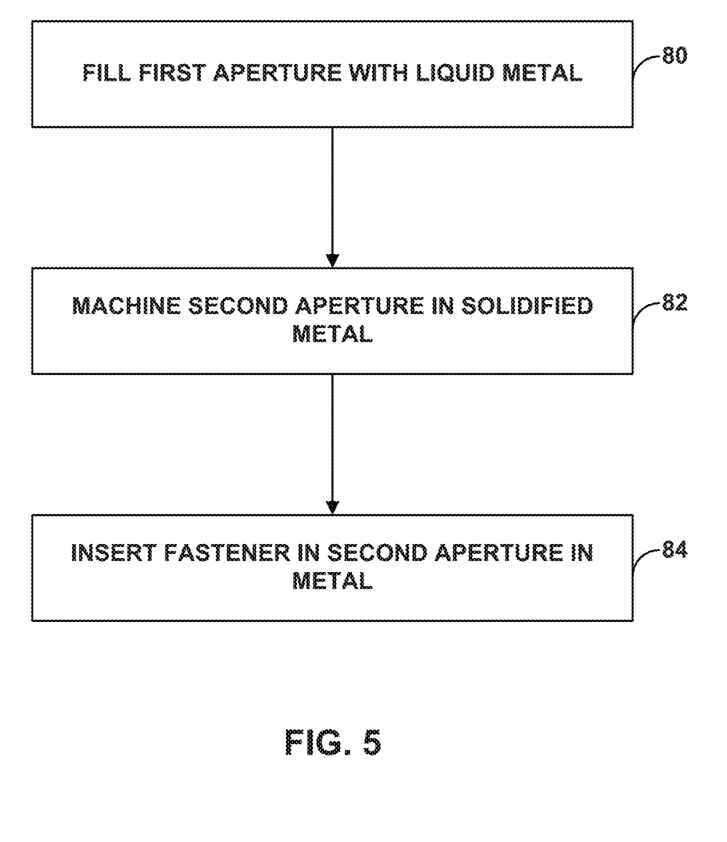
FIG. 5 is a flow diagram illustrating an example technique for reinforcing an oxide-oxide CMC with a metallic material in accordance with the disclosure.

FIG. 5 is flow diagram illustrating an example technique for applying a metallic material in an aperture formed in an ox-ox CMC to reinforce the ox-ox CMC in the area of the aperture. For ease of description, the example technique of FIG. 5 is described with regard to FIGS. 6A-6C. However, the example technique of FIG. 5 is not limited to the particular example application illustrated in FIGS. 6A-6C.

Figure 6A:
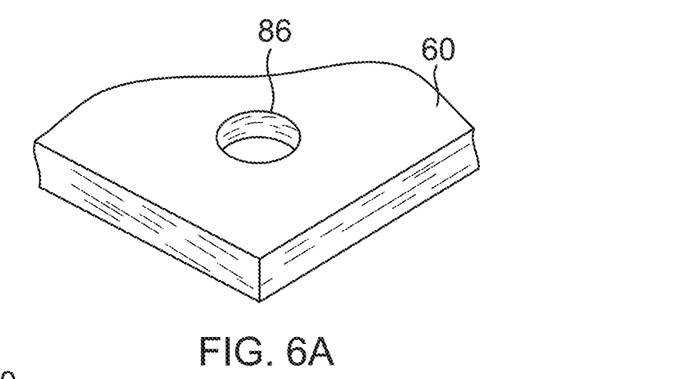
FIGS. 6A-6C are conceptual diagrams illustrating the reinforcement of at an edge of oxide-oxide CMC with a metallic material in accordance with another example of the disclosure.
Figure 6B:
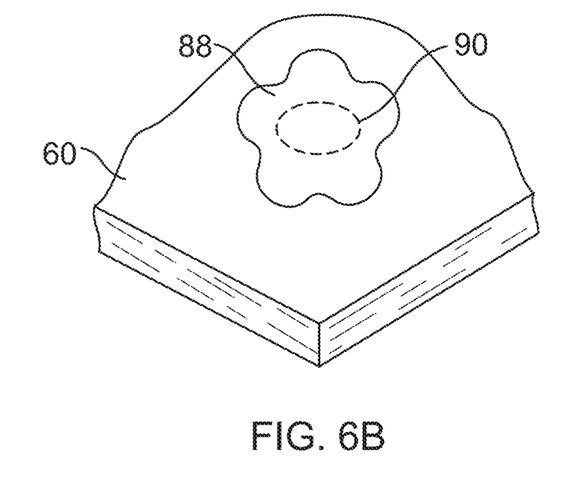

FIG. 6A is a schematic conceptual diagram illustrating first aperture 86 in ox-ox CMC 60 which extends all the way through the thickness of CMC 60. While aperture 86 in FIG. 6A has a circular shape, other shapes are contemplated. As indicated in FIG. 5, a reinforcing metal material may be deposited in first aperture 86 by filling aperture 86 with a liquid metal 88 (80), as shown in FIG. 6B. In other examples, the reinforcing metal material may be applied around the edges of aperture 86 using one more of the technique described herein, e.g., with regard to FIGS. 2-4B. Liquid metal 88 may be deposited using any suitable technique such as, e.g., pouring, injection, vacuum-motivation, and immersion. Liquid metal 88 may have a composition the same or similar to that described for metallic materials 66 and 74.

As shown in FIG. 6B, in some examples, an amount of liquid metal 88 may be deposited so that the metallic material overflows from aperture 86. Upon overflowing, liquid metal 88 may cover a portion of the top and/or bottom surface of CMC 60 surrounding aperture 86 to coat those surfaces with liquid metal 88. The boundary of liquid metal 88 may be defined, e.g., by means of mechanical gating and/or sealing, or via the application of surface treatments that prevent wetting (e.g., referred to as a "stop-off" in some cases), as described herein. Liquid metal 88 may diffuse into CMC 60 to penetrate partially or substantially completely through the thickness of CMC 60, e.g., as described above with regard to FIGS. 3B and 3C.

Figure 6C:
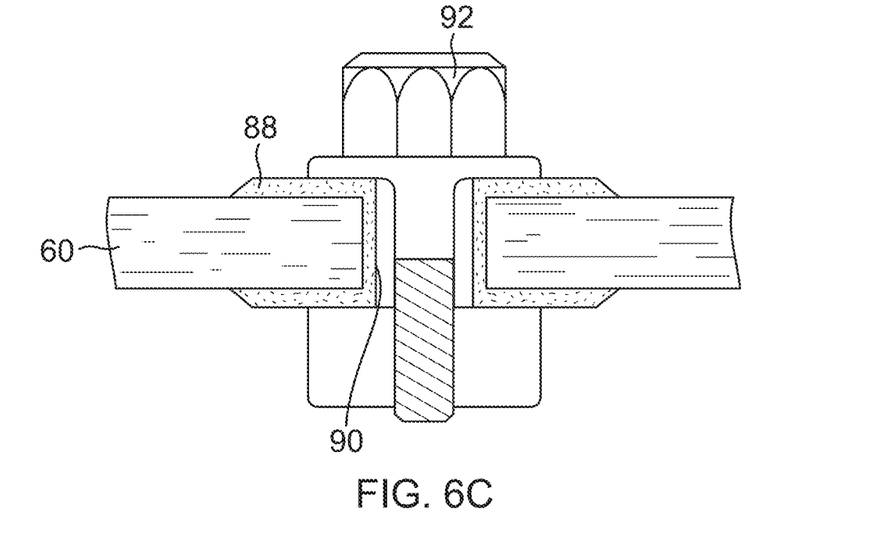

Once the liquid metal 86 cools, second aperture 90 (represented by the dashed line in FIG. 6B) may be machined or otherwise formed in the solidified metal portion. As shown in FIG. 6C, which is a cross-section of CMC 60 in the area of apertures 86 and 90, a bolt 92 or other mechanical fastener may then be inserted into second aperture 90. Bolt 92 may be used to attach mixer 46 to one or more other components of engine 10. As noted above, mechanical fasteners other than that of bolt 92 may be used.

As shown in FIG. 6C, metallic material 88 forms a coating in and around the edges of aperture 86 in CMC 60. In this manner, metallic material 88 may isolate bolt 92 from CMC 60 or otherwise prevent direct contact between bolt 92 and CMC 60. Additionally, metallic material 88 may define a spotface or relatively smooth and/or flat surface opposing bolt 92 when bolt 92 is located within aperture 90. The thickness of the metallic material 88 on the walls of aperture 86 and surrounding surfaces of CMC 60 surrounding aperture 86 may depend on the amount of metallic material 88 deposited relative to the volume of aperture. In some examples, metallic material may have a thickness of at least about 0.005 inches, such as about 0.005 inches to about 0.050 inches. Other values are contemplated. Additionally, or alternatively, at least a portion of the deposited liquid metallic material 88 may diffuse into CMC 60 surrounding aperture 86, e.g., as described above, to bond the ox-ox CMC structure and the metallic material.

Figure 7:
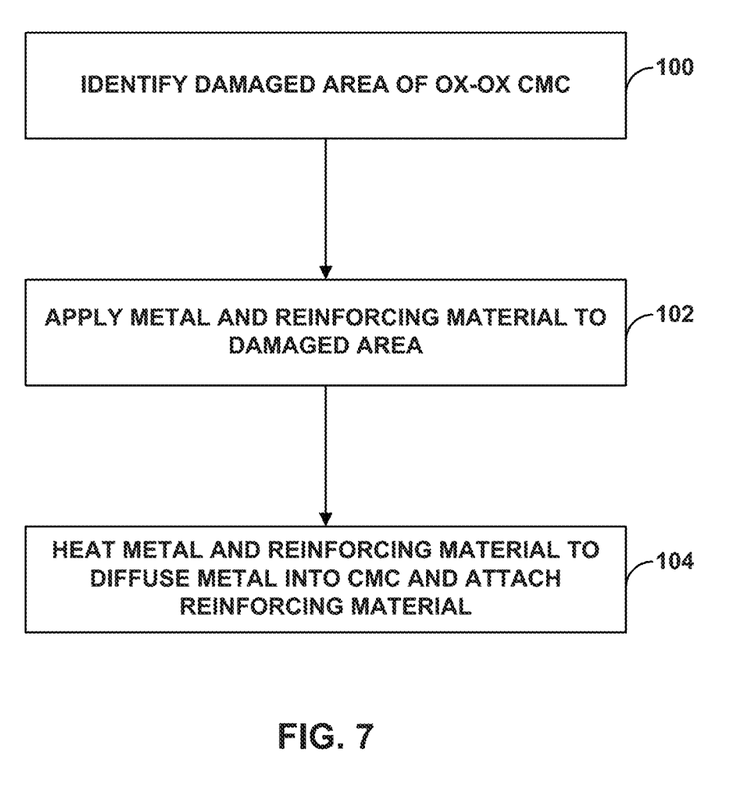
FIG. 7 is a flow diagram illustrating an example technique for repairing an oxide-oxide CMC with a metallic material in accordance with the disclosure.

As noted above, in addition to reinforcing an ox-ox CMC at an edge of the CMC with a metallic material, examples of the disclosure may also include the repair of a damage area of an ox-ox CMC with a metallic material. FIG. 7 is a flow diagram illustrating an example technique for repairing a damaged area of an ox-ox CMC in accordance with the disclosure. For ease of description, the example technique of FIG. 7 is described relative to FIGS. 8A-8C, which are schematic diagrams illustrating the repair of crack 110 in substrate 60. However, examples of the disclosure are not limited to the repair of cracks in an ox-ox CMC, such as that shown in FIGS. 8A-8C. For example, the example process of FIG. 7 may be employed to repair other types of damage to CMC 60, such as, delaminations, crushed matrix, or loss of matrix.

Figures 8A, 8B, 8C:
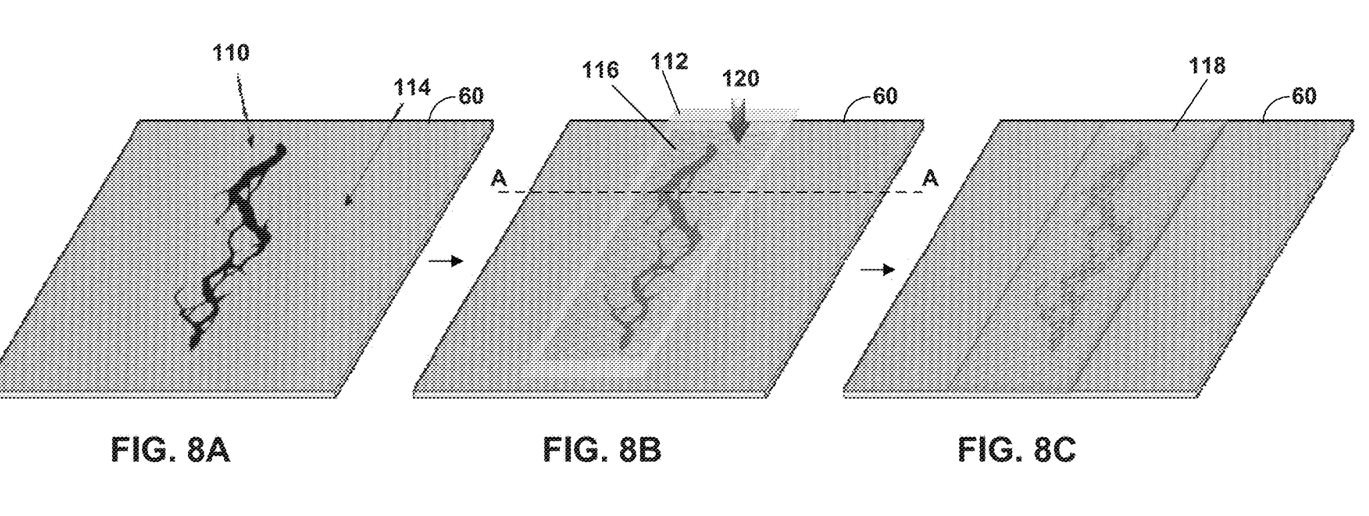
FIGS. 8A-8C are conceptual diagrams illustrating the repair of a damaged area of oxide-oxide CMC with a metallic material in accordance with another example of the disclosure.

As shown in FIG. 8A, CMC 60 has crack 110 which extends into upper surface 114 of CMC 60. Crack 110 may constitute a portion of CMC 60 where ceramic fiber is no longer contiguous, and may include separation between fiber layers in the surrounding area. Crack 110 may be a result of impact damage due to a foreign body, localized mechanical stress exceeding material capability, or thermally driven to induce shock. In some examples, crack 110 may extend all the way through the thickness of CMC 60 or crack 110 may extend only partially through the thickness of CMC 60.

Referring to FIG. 7, crack 110 (or other damaged area) may be identified using any suitable process (100). For example, crack 110 may be identified upon visual inspection of CMC 60, e.g., before or after the operation of engine 10. Additionally, or alternatively, crack 110 may be identified by infrared thermography, X-Ray computed tomography, acoustic methods, ultrasonic methods, terahertz imaging methods, or microwave based methods.

Subsequently, metallic material 112 and reinforcing phase material 116 may be applied over crack 110 on CMC 60 (102). In some examples, metallic material 112 may include one or more layers applied over crack 110 and reinforcing phase material 116 may include one or more layers applied over crack 110. As described below, in some examples, a layer of reinforcing phase material 116 may be between layers of metallic material 112 on CMC 60 over crack 110. In other examples, one or more layers of metallic material 112 may be applied onto CMC 60 followed by the deposition of one or more layer of reinforcing phase material 116. Conversely, one or more layer of reinforcing phase material 116 may first be applied to CMC 60 followed by the deposition of one or more layers of metallic material 112. In some examples, metallic material 112 and reinforcing phase material 116 may be applied over crack 110 on CMC 60 such that one or more layers of metallic material 112 alternates with one or more layers of reinforcing phase material 116.

Metallic material 112 may be the same or substantially similar to that of the liquid and solid (including metal-containing powder) metallic materials described above with regard to the reinforcement at an edge of CMC 60. Metallic material 112 may be applied onto CMC 60 over crack 110 using one or more of the techniques described above, e.g., for applying metallic material 66 and 74 for reinforcement of CMC 60.

Reinforcing phase material 116 may include a plurality of fibers, such as, e.g., those fibers described above for ox-ox CMC 60. In some examples, reinforcing phase material 116 includes one or more layers of fibers such as woven or nonwoven fabric layer(s) or plies formed of the described fibers. In some examples, reinforcement phase material 116 may include chopped oxide fiber or whiskers. Other fiber compositions are considered, including carbon and/or silicon carbide. In some examples, reinforcing phase material 116 may include the same type of fiber (e.g., in terms of composition) as that used to form CMC 60, while in other examples, the fibers of reinforcing phase material 116 may have a different composition than the fibers of CMC 60. In examples in which the same fibers are used for reinforcing phase material 116 as that used to form CMC 60, the fibers are compatible with each other, e.g., so any thermal expansion or chemistry/phase change issues will not be an issue.

Depending on the requirement of the reinforcing phase material 116, chopped fiber or whiskers may additionally or alternatively be used in the repair region, e.g., in cases in which the fibers are used to seal an air gap. If the damaged area is a load-bearing region, the continuous fiber to span the gap of the crack may be desirable, e.g., to recover some amount of the original strength.

In some examples, prior to the application of metallic material 112 and reinforcing phase material 116, crack 110 and surrounding area of CMC 60 be prepared by grit blasting, acid washing, and/or heat cleaning. Other surface preparation may be carried out.

Metallic material 112 and reinforcing phase material 116 may be heated such that metallic material 112 diffuses into CMC 60, and metallic material 112 and reinforcement phase material 116 bond to CMC 60 in the area of crack 110 (104). In some examples, metallic material 112 may serve to adhere reinforcement phase 116 to CMC 60, e.g., by melting metallic material 112 so that it diffuses into outer surface 114 of CMC 60 and solidifies around reinforcing phase material 116 and CMC 60. Optionally, pressure (represented by arrow(s) 120) may be applied before, during, and/or after the heating of metallic material 112 and reinforcing phase material 116. Pressure 120 may assist in the penetration of metallic material 112 into CMC 60, e.g., to increase the bonding between metallic material 112 and CMC 60, and/or reinforcing phase material 116 and CMC 60 via metallic material 112. Like that described above, in some examples, the heating of metallic material 112 and reinforcing phase material 116 may take place in an inert or vacuum environment, e.g., to prevent unwanted oxides from interfering with the bonding process.

In some examples, metallic material 112 and reinforcement phase material 116 may be heated to or above the melting temperature of metallic material 112, e.g., to wet the outer surface 114 of CMC and diffuse metallic material 112 into CMC 60. In some examples, metallic material 112 and reinforcement phase material 116 may be heated to the temperatures described above, e.g., for heating metallic material 66 and 74. Techniques for heating metallic material 66 and 74 may be used to heat metallic material 112 and reinforcement phase material 116. In some examples, metallic material 112 and reinforcement phase material 116 may be heated to or above the melting point of metallic material 112 but below the melting temperature of reinforcing phase material 116 so that reinforcing phase material 116 does not melt during the heating process.

Figure 9:
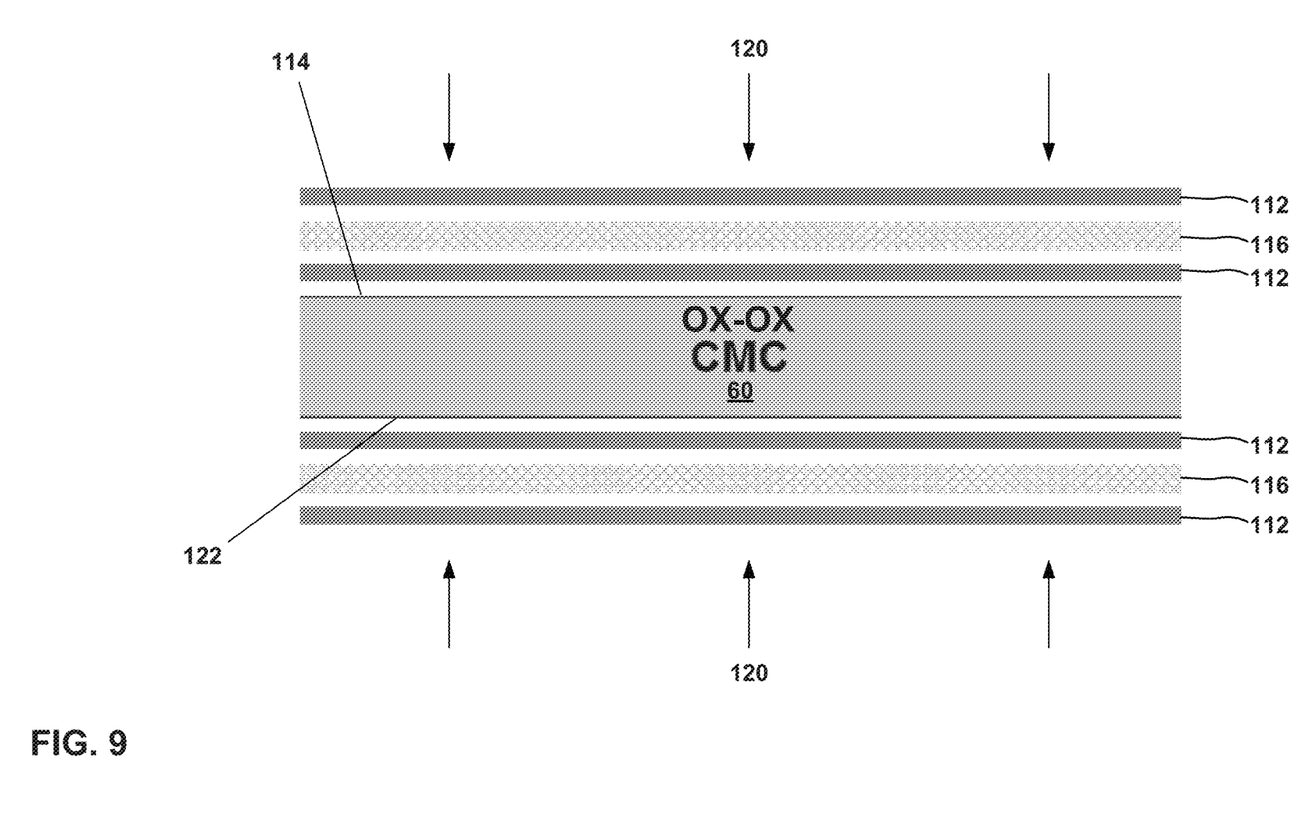
FIG. 9 is a conceptual diagram illustrating an example cross-section of an oxide-oxide CMC during repair with a metallic material in accordance with another example of the disclosure.

FIG. 9 is a schematic diagram illustrating an exploded cross-sectional view along A-A in FIG. 8B showing metallic material 112, reinforcing phase material 116, and CMC 60 in the area of crack 110 (not shown in FIG. 9). As shown, metallic material 112 and reinforcing phase material 116 may be applied to CMC 60 over crack 60 (102) such that a layer of reinforcing phase material 116 is between layers of metallic material 112 on both top surface 114 and bottom surface 112 of CMC 60. In other examples, metallic material 112 and reinforcing phase material 116 may be applied only to a single surface of CMC 60 (e.g., one of top surface 114 or bottom surface 122) in the area of crack 110.

As described above, in some examples, the application and subsequent heating of metallic material 112 and reinforcing phase material 116 may repair crack 110 (or other damaged area of CMC 60) by increasing the strength of CMC 60 in the damaged area, e.g., to recover some or all of the strength of CMC 60 prior to the formation of crack 110. Additionally, or alternatively, the repair of crack 110 using metallic material 112 and reinforcing phase material 116 may restore air sealing capability in the damage region. For example, while the presence of crack 110 may allow for air or other gas to flow into CMC 60 from top surface 114 and bottom surface 112 and/or through CMC 60 between top surface 114 and bottom surface 112, metallic reinforcement portion 118 may seal around crack 110 on top surface 114 and/or bottom surface 112 such that air or other gas does not flow into CMC 60 in the area of crack 110, e.g., during operation of gas turbine engine 10.

Various examples have been described. These and other examples are within the scope of the following clauses and claims.

Clause 1. A method comprising: applying a metallic material at an edge of an oxide-oxide ceramic matrix composite (CMC) substrate; and heating the metallic material to diffuse the metal material into the oxide-oxide CMC substrate at the edge.

Clause 2. The method of clause 1, wherein applying the metallic material comprises applying a solid metal layer at the edge of the oxide-oxide CMC substrate.

Clause 3. The method of clause 2, wherein applying the solid metal layer at the edge of the oxide-oxide CMC substrate comprises attaching the solid metal layer at the edge of the oxide-oxide CMC substrate via an adhesive layer.

Clause 4. The method of clause 2, wherein applying the solid metal layer at the edge of the oxide-oxide CMC substrate comprises penetrating attachment features of the solid metal layer into a surface of the oxide-oxide CMC substrate to attach the solid metal layer at the edge of the oxide-oxide CMC substrate.

Clause 5. The method of clause 1, wherein applying the metallic material comprises depositing a metallic powder at the edge of the oxide-oxide CMC substrate.

Clause 6. The method of clause 1, wherein applying the metallic material comprises dip coating the edge of the oxide-oxide CMC substrate in a liquid metal material.

Clause 7. The method of clause 1, wherein the edge of the oxide-oxide CMC substrate is defined by an aperture extending through the oxide-oxide CMC substrate.

Clause 8. The method of clause 7, wherein applying the metallic material comprises filling the aperture with a liquid metal and cooling the liquid metal within the aperture to form a solid metal member in the aperture.

Clause 9. The method of clause 8, further comprising machining the solid metal member to form an aperture in the solid metal member.

Clause 10. The method of clause 7, wherein applying the metallic layer comprises inserting a solid metal preform in the aperture.

Clause 11. The method of clause 10, wherein the solid metal preform comprises a grommet.

Clause 12. The method of clause 1, wherein the oxide-oxide CMC substrate comprises a plurality of fiber layers stack on each other, wherein the edge of the oxide-oxide CMC substrate is defined by an end of each respective layer of the plurality of fiber layers.

Clause 13. The method of clause 1, wherein the oxide-oxide CMC substrate comprises oxide fibers in an oxide matrix.

Clause 14. The method of clause 13, wherein the oxide fibers comprise alumina fibers and the oxide matrix comprises alumina.

Clause 15. The method of clause 1, wherein heating the metallic material comprises heating to the metallic material to a temperature of about 400 degrees Celsius to about 900 degrees Celsius.

Clause 16. The method of clause 1, wherein the oxide-oxide CMC substrate comprises a plurality of fiber layers stack on each other, wherein heating the metallic material to diffuse the metal material into the oxide-oxide CMC substrate at the edge comprises bonding respective layers of the plurality of fiber layers to each other by the diffused metallic material.

Clause 17. The method of clause 1, wherein metallic material comprises aluminum, and wherein the oxide-oxide CMC substrate comprises alumina fibers in an aluminosilicate matrix.

Clause 18. An article comprising: an oxide-oxide ceramic matrix composite (CMC) substrate having an edge; and a metallic material at least partially penetrating into a surface of the oxide-oxide CMC substrate at the edge.

Clause 19. The article of clause 18, wherein the metallic material penetrates substantially through a thickness of the oxide-oxide CMC substrate at the edge.

Clause 20. The article of clause 18, wherein the edge of the oxide-oxide CMC substrate is defined by an aperture extending through the oxide-oxide CMC substrate.

Clause 21. The article of clause 18, wherein the oxide-oxide CMC substrate comprises a plurality of fiber layers stack on each other, wherein the edge of the oxide-oxide CMC substrate is defined by an end of each respective layer of the plurality of fiber layers.

Clause 22. The article of clause 18, wherein the oxide-oxide CMC substrate comprises oxide fibers in an oxide matrix.

Clause 23. The article of clause 22, wherein the oxide fibers comprise alumina fibers and the oxide matrix comprises alumina.

Clause 24. The article of clause 18, wherein metallic material comprises aluminum, and wherein the oxide-oxide CMC substrate comprises alumina fibers in an aluminosilicate matrix.

Clause 25. The article of clause 18, wherein the metallic material comprises at least one of aluminum, iron, nickel, magnesium, or cobalt.

Clause 26. An article formed according to a method according to any one of clauses 1-17.

Clause 27. A method of repairing a damaged area of an oxide-oxide ceramic matrix composite (CMC), the method comprising: applying a metallic material onto the damaged area of the oxide-oxide CMC; applying a reinforcing phase material onto the damaged area of the oxide-oxide CMC; and heating the metallic material to diffuse the metallic material into the oxide-oxide CMC and attach the reinforcing phase material to the damaged area of the oxide-oxide CMC.

Clause 28. The method of clause 27, wherein applying the metallic material comprises applying a solid metal layer to the damaged area.

Clause 29. The method of clause 27, wherein applying a solid metal layer to the damaged area comprises attaching the solid metal layer to the damaged area via an adhesive.

Clause 30. The method of clause 27, wherein the reinforcing phase material comprises a plurality of ceramic fibers.

Clause 31. The method of clause 27, wherein the plurality of ceramic fibers comprises a ceramic fiber fabric layer.

Clause 32. The method of clause 27, wherein applying the reinforcing phase material comprises applying the reinforcing phase material onto the metallic material on the damaged area of the oxide-oxide CMC.

Clause 33. The method of clause 32, further comprising applying the metallic material onto the reinforcing phase on the damaged area of the oxide-oxide CMC such that the reinforcing phase in located between the metallic material on the damaged area of the oxide-oxide CMC.

Clause 34. The method of clause 27, wherein applying a reinforcing phase material onto the damaged area of the oxide-oxide CMC comprises applying the reinforcing phase material onto the damaged area prior to the application of the metallic material.

Clause 35. The method of clause 27, further comprising applying pressure to the metallic material and the reinforcing phase during the heating of the metallic material and the reinforcing phase.

Clause 36. The method of clause 27, wherein heating the metallic material comprises heating to the metallic material to a temperature of about 400 degrees Celsius to about 900 degrees Celsius.

Clause 37. The method of clause 27, wherein the oxide-oxide CMC substrate comprises a plurality of fiber layers stack on each other, wherein the damaged area comprises a crack in at least an outer fiber layer of the plurality of fiber layers.

Clause 38. The method of clause 27, wherein the oxide-oxide CMC substrate comprises oxide fibers in an oxide matrix.

Clause 39. The method of clause 38, wherein the oxide fibers comprise alumina fibers and the oxide matrix comprises alumina.

Clause 40. The method of clause 27, wherein metallic material comprises aluminum, and wherein the oxide-oxide CMC substrate comprises alumina fibers in an aluminosilicate matrix.

Clause 41. The method of clause 27, wherein the reinforcement fibers comprise alumina fibers.

Clause 42. An article comprising: an oxide-oxide ceramic matrix composite (CMC) having a damaged area; and a metallic material and a reinforcing phase material applied to the damaged area.

Clause 43. The article of clause 42, wherein the metallic material at least partially penetrates into the oxide-oxide CMC and attaches the reinforcing phase material to the oxide-oxide CMC in the damaged area.

Clause 44. The article of clause 42, wherein the reinforcing phase material comprises a plurality of ceramic fibers.

Clause 45. The article of clause 42, wherein the plurality of ceramic fibers comprises a ceramic fiber fabric layer.

Clause 46. The article of clause 42, wherein the oxide-oxide CMC substrate comprises a plurality of fiber layers stack on each other, wherein the damaged area comprises a crack in at least an outer fiber layer of the plurality of fiber layers.

Clause 47. The article of clause 42, wherein the oxide-oxide CMC substrate comprises oxide fibers in an oxide matrix.

Clause 48. The article of clause 47, wherein the oxide fibers comprise alumina fibers and the oxide matrix comprises alumina.

Clause 49. The article of clause 42, wherein metallic material comprises aluminum, and wherein the oxide-oxide CMC substrate comprises alumina fibers in an aluminosilicate matrix.

Clause 50. The article of clause 42, wherein the reinforcement fibers comprise alumina fibers.

Clause 51. An article formed according to a method according to any one of clauses 27-41.

What is claimed is:

1. A method comprising:
    applying a metallic material at an edge of an oxide-oxide ceramic matrix composite (CMC) substrate, the oxide-oxide CMC substrate having a first outer surface, a second outer surface, and a plurality of oxide fiber layers stacked between the first outer surface and the second outer surface, wherein the metallic material is applied to the first outer surface and the second outer surface of the oxide-oxide CMC substrate; and
    heating the metallic material to diffuse the metallic material into the first outer surface and the second outer surface of the oxide-oxide CMC substrate at the edge.

2. The method of claim 1, wherein applying the metallic material comprises applying a solid metal layer at the edge of the oxide-oxide CMC substrate.

3. The method of claim 2, wherein applying the solid metal layer at the edge of the oxide-oxide CMC substrate comprises attaching the solid metal layer at the edge of the oxide-oxide CMC substrate via an adhesive layer.

4. The method of claim 2, wherein applying the solid metal layer at the edge of the oxide-oxide CMC substrate comprises penetrating attachment features of the solid metal layer into a surface of the oxide-oxide CMC substrate to attach the solid metal layer at the edge of the oxide-oxide CMC substrate.

5. The method of claim 1, wherein applying the metallic material comprises depositing a metallic powder at the edge of the oxide-oxide CMC substrate.

6. The method of claim 1, wherein applying the metallic material comprises dip coating the edge of the oxide-oxide CMC substrate in a liquid metal material.

7. The method of claim 1, wherein the edge of the oxide-oxide CMC substrate is defined by an aperture extending through the oxide-oxide CMC substrate.

8. The method of claim 7, wherein applying the metallic material comprises filling the aperture with a liquid metal and cooling the liquid metal within the aperture to form a solid metal member in the aperture.

9. The method of claim 8, further comprising machining the solid metal member to form an aperture in the solid metal member.

10. The method of claim 7, wherein applying the metallic material comprises inserting a solid metal preform in the aperture.

11. The method of claim 10, wherein the solid metal preform comprises a grommet.

12. The method of claim 1, wherein the edge of the oxide-oxide CMC substrate is defined by an end of each respective layer of the plurality of oxide fiber layers.

13. The method of claim 1, wherein the oxide-oxide CMC substrate comprises oxide fibers in an oxide matrix.

14. The method of claim 13, wherein the oxide fibers comprise alumina fibers and the oxide matrix comprises alumina.

15. The method of claim 1, wherein heating the metallic material comprises heating to the metallic material to a temperature of about 400 degrees Celsius to about 900 degrees Celsius.

16. The method of claim 1, wherein heating the metallic material to diffuse the metallic material into the oxide-oxide CMC substrate at the edge comprises bonding respective layers of the plurality of oxide fiber layers to each other by the diffused metallic material.

17. The method of claim 1, wherein metallic material comprises aluminum, and wherein the oxide-oxide CMC substrate comprises alumina fibers in an aluminosilicate matrix.

18. The method of claim 1, wherein applying the metallic material at the edge of an oxide-oxide ceramic matrix composite (CMC) substrate comprises applying the metallic material such that the metallic material wraps around the edge of the stacked plurality of oxide fiber layers and extends from the first outer surface and the second outer surface of the oxide-oxide CMC substrate along the edge.

19. The method of claim 1, wherein heating the metallic material to diffuse the metallic material into the first outer surface and the second outer surface of the oxide-oxide CMC substrate at the edge comprises heating the metallic material to diffuse the metallic material into the first outer surface and the second outer surface of the oxide-oxide CMC substrate at the edge so that the metallic material diffuses into the plurality of oxide fiber layers stacked between the first outer surface and the second outer surface.

20. A method comprising:
    applying a metallic material at an edge of an oxide-oxide ceramic matrix composite (CMC) substrate; and
    heating the metallic material to diffuse the metallic material into the oxide-oxide CMC substrate at the edge, wherein applying the metallic material comprises applying a solid metal layer at the edge of the oxide-oxide CMC substrate, and wherein applying the solid metal layer at the edge of the oxide-oxide CMC substrate comprises penetrating attachment features of the solid metal layer into a surface of the oxide-oxide CMC substrate to attach the solid metal layer at the edge of the oxide-oxide CMC substrate.

* * * * *